United States Patent
Zhang et al.

(10) Patent No.: US 10,811,742 B2
(45) Date of Patent: Oct. 20, 2020

(54) HEAT DISSIPATING FIXTURE FOR BATTERY UNIT AND BATTERY MODULE

(71) Applicant: CONTEMPORARY AMPEREX TECHNOLOGY CO., LIMITED, Ningde (CN)

(72) Inventors: Shangfu Zhang, Ningde (CN); Wenhui Zhang, Ningde (CN); Jihua Yao, Ningde (CN); Mu Qian, Ningde (CN); Yanhuo Xiang, Ningde (CN); Taosheng Zhu, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 176 days.

(21) Appl. No.: 16/051,239

(22) Filed: Jul. 31, 2018

(65) Prior Publication Data

US 2019/0067762 A1    Feb. 28, 2019

(30) Foreign Application Priority Data

Aug. 31, 2017 (CN) .......................... 2017 1 0770732

(51) Int. Cl.
*H01M 10/613* (2014.01)
*H01M 10/6555* (2014.01)
(Continued)

(52) U.S. Cl.
CPC ....... *H01M 10/647* (2015.04); *H01M 2/1061* (2013.01); *H01M 2/1077* (2013.01);
(Continued)

(58) Field of Classification Search
None
See application file for complete search history.

(56) References Cited

U.S. PATENT DOCUMENTS

| 6,346,011 B1 * | 2/2002 | Ikeda | H01M 2/1077 439/500 |
| 2012/0263988 A1 * | 10/2012 | Obasih | H01M 10/625 429/98 |

(Continued)

FOREIGN PATENT DOCUMENTS

EP    2366200 A1    9/2011

OTHER PUBLICATIONS

Contemporary Amperex Technology Co., Limited, Extended European Search Report, EP18186816.7, Jan. 2, 2019, 8 pgs.

*Primary Examiner* — Wojciech Haske
(74) *Attorney, Agent, or Firm* — Morgan, Lewis & Bockius LLP

(57) ABSTRACT

The present disclosure provides a fixture, a battery unit and a battery module. The fixture comprises at least one thermal conductive plate and two support blocks. Each thermal conductive plate comprises an abutting portion, a contact portion and a connecting portion. The two support blocks are fixed on two ends of the at least one thermal conductive plate in a length direction; the abutting portion, the connecting portion and the contact portion and the two support blocks form a receiving space. The battery unit comprises at least one pouch-shaped secondary battery having a main body and the fixture, the abutting portion is attached to the main body. The battery module comprises a thermal conductive frame and the battery units. The thermal conductive frame comprises a peripheral wall and a receiving cavity, the battery units are received in the receiving cavity, the contact portion contacts the peripheral wall.

10 Claims, 7 Drawing Sheets

(51) Int. Cl.
*H01M 10/647* (2014.01)
*H01M 10/653* (2014.01)
*H01M 10/04* (2006.01)
*H01M 2/10* (2006.01)
*H01M 10/6554* (2014.01)

(52) U.S. Cl.
CPC ..... *H01M 10/045* (2013.01); *H01M 10/0486* (2013.01); *H01M 10/613* (2015.04); *H01M 10/653* (2015.04); *H01M 10/6555* (2015.04); *H01M 10/6554* (2015.04)

(56) References Cited

U.S. PATENT DOCUMENTS

| | | |
|---|---|---|
| 2015/0010801 A1 | 1/2015 | Arena et al. |
| 2015/0086832 A1 | 3/2015 | Yang et al. |
| 2015/0221996 A1 | 8/2015 | Jin et al. |
| 2017/0187082 A1 | 6/2017 | Zhao et al. |

\* cited by examiner

HEAT DISSIPATING FIXTURE FOR BATTERY UNIT AND BATTERY MODULE

CROSS-REFERENCE TO RELATED APPLICATIONS

The present application claims priority to Chinese patent application No. CN201710770732.2, filed on Aug. 31, 2017, which is incorporated herein by reference in its entirety.

FIELD OF THE PRESENT DISCLOSURE

The present disclosure relates to the field of battery, and particularly relates to a fixture, a battery unit and a battery module.

BACKGROUND OF THE PRESENT DISCLOSURE

A secondary battery has various forms. Depending on the type of the case, the secondary battery can be divided into a pouch-shaped secondary battery and a can-shaped secondary battery. The case of the pouch-shaped secondary battery is made of a laminate sheet comprising polymer layers and a metal layer. The case of the can-shaped secondary battery usually is composed of a metal shell and a metal cap plate.

In a battery module, a plurality of secondary batteries are arranged side by side and fixed by a corresponding frame.

An assembling process of the battery module using the can-shaped secondary batteries usually is: compressing the plurality of can-shaped secondary batteries arranged with a front end plate and a rear end plate together, and then welding and fixing two side plates to the end plates, finally providing a water cooling system (even a thermal conductive silicone pad) below a bottom of the plurality of the can-shaped secondary batteries.

At present, in order to resolve the assembling problem of the battery module using the pouch-shaped secondary batteries, it usually needs to use the structure using aluminum plates or plastics which are latched with each other in a front-rear direction to form a battery unit and then assemble the battery units with each other to achieve the assembling of an overall battery module, but using this assembling way has the following problems:

The battery module is difficult to dissipate heat, the temperature difference in different locations of the large surface of the pouch-shaped secondary battery is large. The main reasons are: (1) the thermal conductive area of the bottom (only the bottom contacts the external cooling mechanism) of the structure using the traditional aluminum plates or the plastics which are latched with each other in the front-rear direction is small, which results in the overall heat dissipation performance of the battery module poor; (2) the area of the main body of the single pouch-shaped secondary battery is larger, the design of the traditional battery module using the pouch-shaped secondary batteries conducts heat in a single direction and in a single position, which results in that the heat dissipation performances of the single pouch-shaped secondary battery at different locations are inconsistent, and in turn results in that the temperature difference on different locations of the large surface of the single pouch-shaped secondary battery is large, even seriously, it will cause the failure of performance of the pouch-shaped secondary batteries.

The assembling efficiency of the battery module is low. In the traditional assembling method of the battery module using the pouch-shaped secondary batteries, many components and materials are used, and the use of space is unreasonable, which results in a lower overall assembling efficiency of the battery module.

The battery module has high cost. In the traditional assembling method of the battery module using the pouch-shaped secondary batteries, many components and materials are used, the assembling process is complex, material costs and manufacturing costs are relatively high.

SUMMARY OF THE PRESENT DISCLOSURE

In view of the problem exiting in the background, an object of the present disclosure is to provide a fixture, a battery unit and a battery module, compared with the structure using the traditional aluminum plates or the plastics which are latched with each other in the front-rear direction in the prior art, when the fixture is applied to the battery unit and in turn is applied to the battery module, it can improve the heat dissipation effect of the battery module, and also can improve the assembling efficiency of the battery module and reduce the cost.

In order to achieve the above object, in a first aspect, the present disclosure provides a fixture which comprises: at least one thermal conductive plate and two support blocks. Each thermal conductive plate comprises: an abutting portion extending along a height direction; a contact portion positioned at a side of the abutting portion in the height direction and extending toward a thickness direction of the thermal conductive plate; and a connecting portion connecting the abutting portion and the contact portion along the height direction. The two support blocks are respectively fixed on two ends of the at least one thermal conductive plate in a length direction; the abutting portion, the connecting portion and the contact portion of each thermal conductive plate and the two support blocks form a receiving space having an opening opened away from the abutting portion.

In order to achieve the above object, in a second aspect, the present disclosure provides a battery unit, which comprises at least one pouch-shaped secondary battery, each pouch-shaped secondary battery comprises a main body, the battery unit further comprises the fixture according to the first aspect of the present disclosure; each pouch-shaped secondary battery is fixed in one receiving space of the fixture; the abutting portion of each thermal conductive plate is attached to the main body of each pouch-shaped secondary battery along the thickness direction.

In order to achieve the above object, in a third aspect, the present disclosure provides a battery module, which comprises a thermal conductive frame. The thermal conductive frame has a peripheral wall and a receiving cavity enclosed by the peripheral wall, the receiving cavity is closed in a circumferential direction and is opened at two ends in a length direction; the battery module further comprises a plurality of battery units according to the second aspect of the present disclosure, the plurality of battery units are arranged side by side and received in the receiving cavity, and the contact portion of each thermal conductive plate contact the peripheral wall of the thermal conductive frame.

The present disclosure has the following beneficial effects: in the fixture according to the first aspect of the present disclosure, compared with the structure using the traditional aluminum plates or the plastics which are latched with each other in the front-rear direction in the prior art, when the fixture of the first aspect of the present disclosure is applied to the battery unit and in turn is applied to the battery module, it improves the heat dissipation effect of the battery module, reduces the number of assembled components, improves the assembling efficiency of the battery module, and reduces the costs.

REFERENCE NUMERALS ARE REPRESENTED AS FOLLOWS

Figure 1:
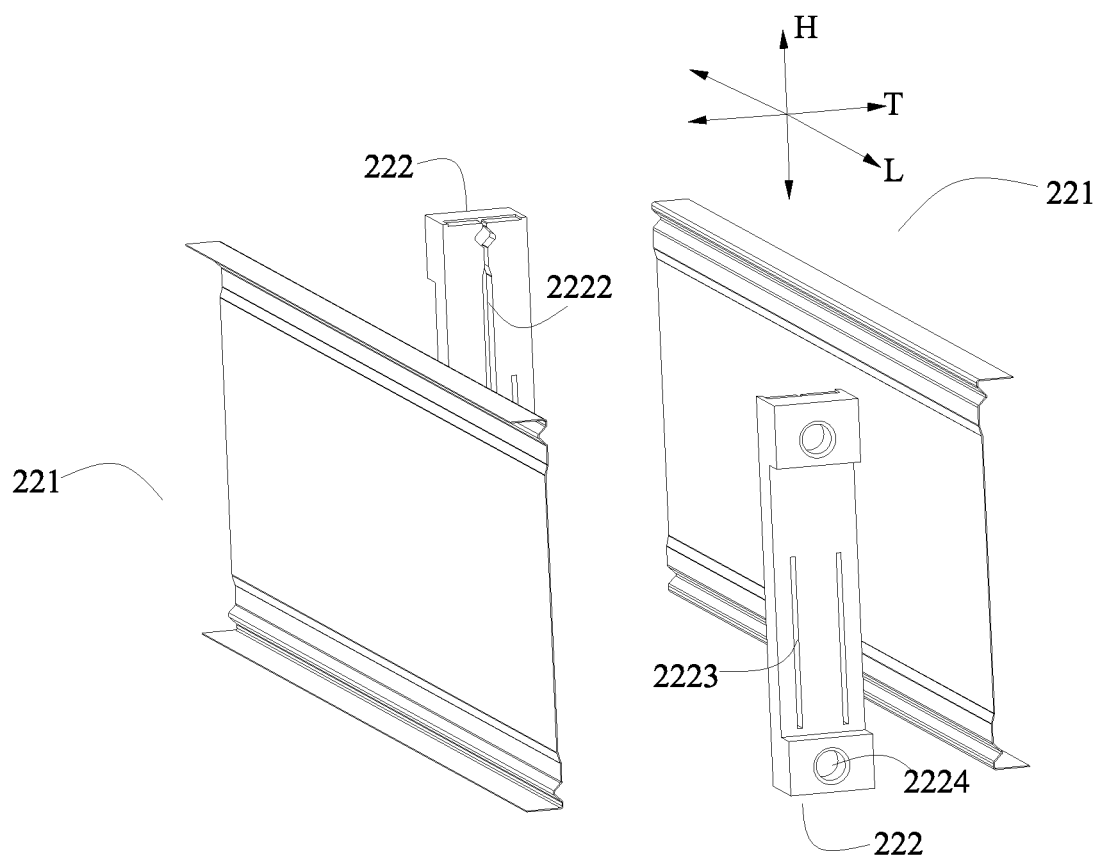
FIG. 1 is an exploded perspective view of a fixture according to the present disclosure.
Figure 2:
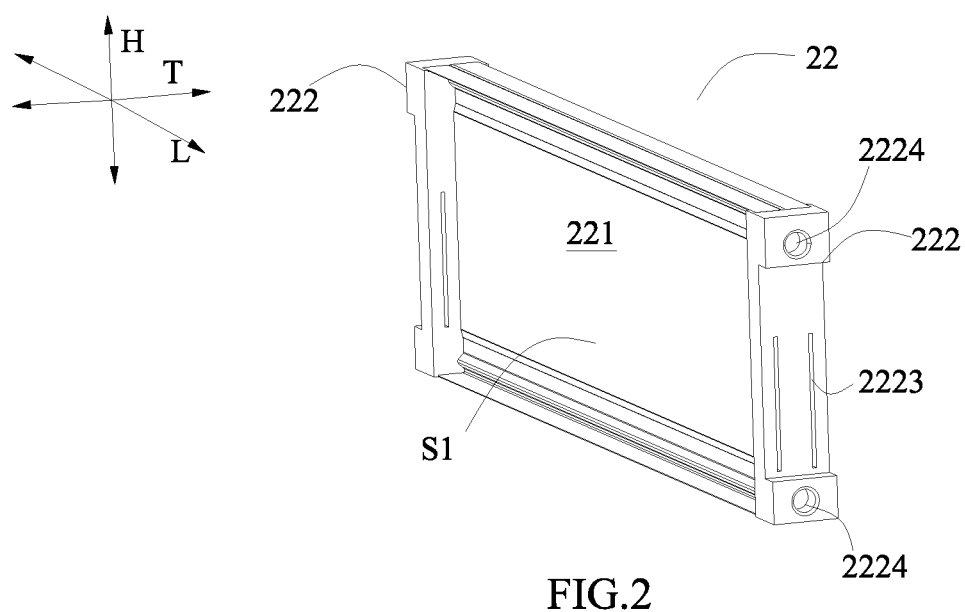
FIG. 2 is an assembled view of FIG. 1.
Figure 3:
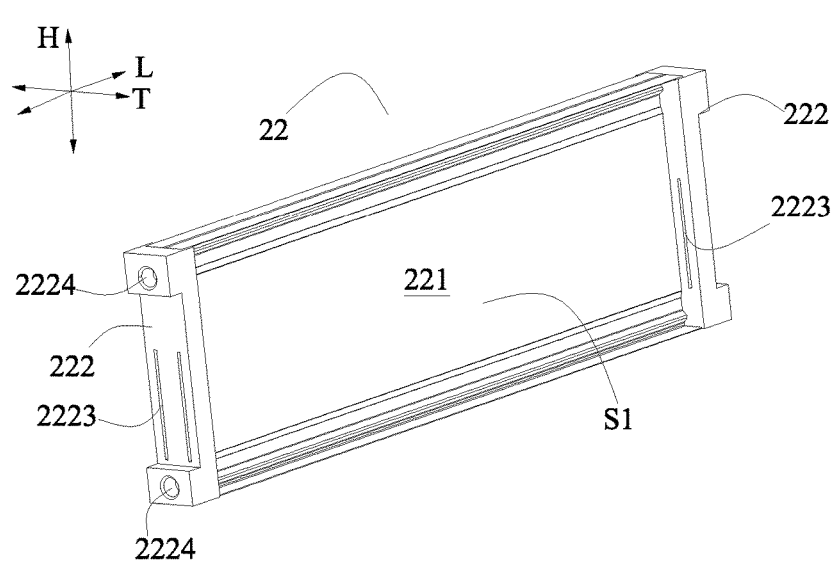
FIG. 3 is an assembled view of FIG. 2 viewed from another angle.

M battery module
1 thermal conductive frame
11 peripheral wall
111 recessed portion
112 end surface
12 receiving cavity
2 battery unit
21 pouch-shaped secondary battery
211 main body
212 electrode tab
22 fixture
221 thermal conductive plate
S1 receiving space
S2 hollow cavity
S3 middle space
2211 abutting portion
2212 contact portion
2213 connecting portion
C1 bending section
C2 connection section
C3 abutting section
C4 inclined section
222 support block
2221 recessed groove
2222 receiving groove
2223 through hole
2224 positioning groove
L length direction
T thickness direction
H height direction
3 connecting piece
31 upright portion
4 output piece
41 protrusion
5 elastic buffering pad
6 end plate
61 plate body
611 positioning protrusion
612 inner surface
62 insert
621 protruding portion

DETAILED DESCRIPTION

Hereinafter a fixture, a battery unit and a battery module of the present disclosure will be described in detail in combination with the figures.

Firstly, a fixture according to a first aspect of the present disclosure will be described.

As shown in FIG. 1 to FIG. 10, a fixture 22 of the first aspect of the present disclosure comprises at least one thermal conductive plate 221 and two support blocks 222. Each thermal conductive plate 221 comprises: an abutting portion 2211 extending along a height direction H; a contact portion 2212 positioned at a side of the abutting portion 2211 in the height direction H and extending toward a thickness direction T of the thermal conductive plate 221; and a connecting portion 2213 connecting the abutting portion 2211 and the contact portion 2212 along the height direction H. The two support blocks 222 are respectively fixed on two ends of the at least one thermal conductive plate 221 in a length direction L; the abutting portion 2211, the connecting portion 2213 and the contact portion 2212 of each thermal conductive plate 221 and the two support blocks 222 form a receiving space S1 having an opening opened away from the abutting portion 2211.

In the fixture 22 according to the first aspect of the present disclosure, when the fixture 22 of the first aspect of the present disclosure is applied to a battery unit 2 and a battery module M described below, compared with the structure using the traditional aluminum plates or the plastics which are latched with each other in the front-rear direction in the prior art, the abutting portion 2211 of each thermal conductive plate 221 is attached onto the main body 211 of the pouch-shaped secondary battery 21 described below along the thickness direction T, heat generated by the pouch-shaped secondary battery 21 can be transferred to the abutting portion 2211 of the thermal conductive plate 221 attached onto the pouch-shaped secondary battery 21, and then transferred outwardly (such as to the thermal conductive frame 1 described below) via the contact portion 2212 so as to improve the heat dissipation effect of the battery module M; each fixture 22 uses the two support blocks 222 and the at least one pouch-shaped secondary battery 21 to form a battery unit 2, which makes the assembling of the plurality of battery units 2 simple, and reduces the number of assembled components, improves the assembling efficiency of the battery module M and reduces the costs.

As shown in FIG. 1 to FIG. 9, the connecting portion 2213 of each thermal conductive plate 221 is formed with a bending section C1 formed as a V-shape (of course it is not limited to this, but also can be other shapes, such as circular-arc) and extending along the length direction L of each thermal conductive plate 221, a bending corner of the bending section C1 protrudes toward the opening of the receiving space S1. When the battery module M described below is subjected to external mechanical vibration, because a connecting corner between the contact portion 2212 and the connecting portion 2213 of the thermal conductive plate 221 is easily broken due to concentrated stress, the design of the bending section C1 functions as buffering stress at the connecting corner between the contact portion 2212 and the connecting portion 2213, which avoids the stress concentration at the connecting corner and effectively improves the strength of the heat-conductive plate 221, avoids damage to the connecting corner of the heat-conductive plate 221 due to the external mechanical vibration, and lengthen the service life of the battery module M. In addition, the bending section C1 increases the heat dissipation area and the heat dissipation effect and effectively utilizes the space of the battery unit 2 (described below) above the main body 211 of the pouch-shaped secondary battery 21 in the height direction H.

In the fixture 22 according to the first aspect of the present disclosure, preferably, the thermal conductive plate 221 is provided as two in number, the two thermal conductive plates 221 abut together along the thickness direction T of the fixture 22; the bending sections C1 of the two thermal conductive plates 221 are opposed to each other and enclose a hollow cavity S2. The two thermal conductive plates 221 abut together along the thickness direction T of the fixture 22, which allows the heat of the two thermal conductive plates 221 to be coupled together, improves the heat dissipation effect of the main bodies 211 of the two pouch-shaped secondary batteries 21 of the battery unit 2 described below, and improves the uniformity of the temperature of the two pouch-shaped secondary batteries 21. The hollow cavity S2 can alleviate the damage from the external mechanical vibration to the connecting corner of the heat-conductive plate 221, and improves the strength of the heat-conductive plate 221.

Referring to FIG. 1 and FIG. 5 to FIG. 9, the connecting portion 2213 of each thermal conductive plate 221 is further formed with a connection section C2 connecting one end of the bending section C1 in the height direction H and the contact portion 2212.

Figure 8:
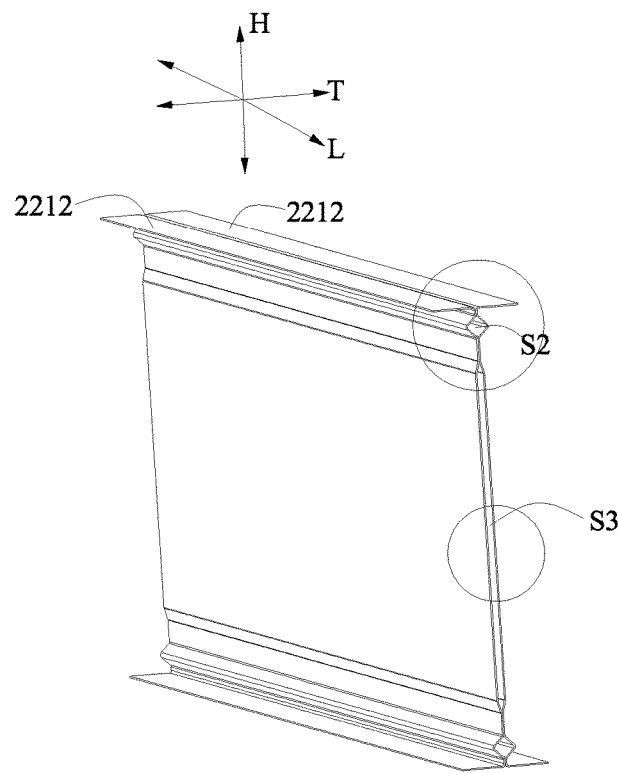
FIG. 8 is a perspective view of FIG. 7.

Specifically, as shown in FIG. 8, the thermal conductive plate 221 is provided as two in number; the two connection sections C2 of the two thermal conductive plates 221 abut together along the thickness direction T of the fixture 22. Similarly, the two connection sections C2 of the two thermal conductive plates 221 abut together along the thickness direction T of the fixture 22, which allows the heat of the two thermal conductive plates 221 to be coupled together, and improves the heat dissipation effect of the main bodies 211 of the two pouch-shaped secondary batteries 21 of the battery unit 2 described below, and improves the uniformity of the temperature of the two pouch-shaped secondary batteries 21.

Figure 9:
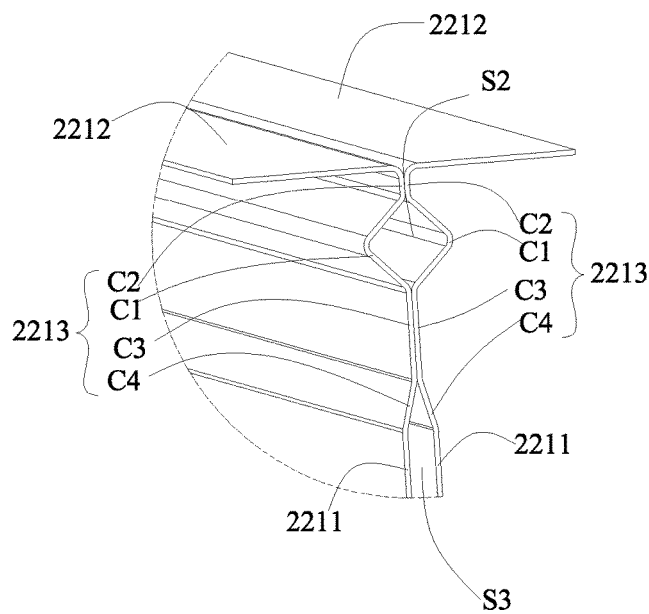
FIG. 9 is an enlarged view of a circle part in FIG. 8.
Figure 10:
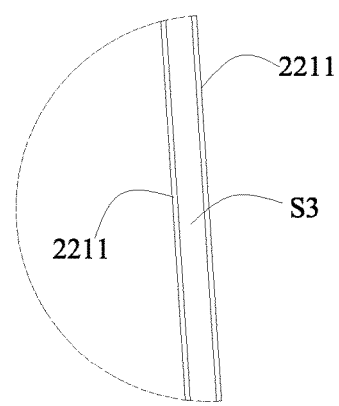
FIG. 10 is an enlarged view of another circle part in FIG. 8.

As shown in FIG. 9, the connecting portion 2213 of each thermal conductive plate 221 is further formed with: an abutting section C3 extending along the height direction H, one end of the abutting section C3 in the height direction H connects with the other end of the bending section C1 in the height direction H; and an inclined section C4 connecting the abutting section C3 and the abutting portion 2211, inclining from the abutting section C3 toward the abutting portion 2211 so that the abutting portion 2211 is close to the opening of the receiving space S1 relative to the abutting section C3.

In the fixture 22 according to the first aspect of the present disclosure, as shown in FIG. 1 to FIG. 3 and FIG. 7 to FIG. 10, the thermal conductive plate 221 is provided as two in number; the two abutting sections C3 of the two thermal conductive plates 221 abut together along the thickness direction T of the fixture 22; the inclined section C4 and the abutting portion 2211 of one thermal conductive plate 221 and the inclined section C4 and the abutting portion 2211 of the other thermal conductive plate 221 are spaced apart from each other to form a middle space S3. Similarly, the two abutting sections C3 of the two thermal conductive plates 221 abut together along the thickness direction T of the fixture 22, which allows the heat of the two thermal conductive plates 221 to be coupled together, and improves the heat dissipation effect of the main body 211 of the two pouch-shaped secondary batteries 21 of the battery unit 2 described below and improves the uniformity of the temperature of the two pouch-shaped secondary batteries 21. The formation of the middle space S3 provides sufficient expansion spaces for the pouch-shaped secondary batteries 21 described below.

As shown in FIG. 1 to FIG. 4, an end of each support block 222 in the height direction H is provided with a recessed groove 2221; an end portion of the contact portion 2212 of each thermal conductive plate 221 in the length direction L is received in the recessed groove 2221. The recessed groove 2221 functions as positioning and supporting the contact portion 2212, and functions as transferring an external force, which is transferred to the contact portion 2212 via the thermal conductive frame 1 when the battery module M is subjected to external impact and/or vibration, to the support block 222 and allows the support block 222 to disperse the external force.

In the fixture 22 according to the first aspect of present disclosure, there are many ways to arrange the contact portion 2212 and the connecting portion 2213 of each thermal conductive plate 221. For example, the contact portion 2212 and the connecting portion 2213 may be provided only at one side of the heat-conductive plate 221; in order to improve the heat transfer efficiency, preferably, the contact portion 2212 and the connecting portion 2213 of each thermal conductive plate 221 are both provided as two in number, and the two contact portions 2212 of each thermal conductive plate 221 are respectively positioned at two sides of the abutting portion 2211 in the height direction H and the two connecting portions 2213 of each thermal conductive plate 221 are respectively positioned at the two sides of the abutting portion 2211 in the height direction H, and thus achieves conducting heat at the two sides in the height direction H. The heat dissipation effect with conducting heat at the two sides in the height direction H is much higher than the heat dissipation effect with conducting heat on the bottom (i.e., conducting heat at one side) in the background technique. The abutting portion 2211 of the heat-conductive plate 212 is a flat plate, so that the abutting portion 2211 can sufficiently contact the relatively flat surface of the main body 211 of the pouch-shaped secondary battery 21 of the described below battery unit 2 and conduct heat.

As shown in FIG. 1 to FIG. 10, preferably, shapes of the two thermal conductive plates 221 are the same, and the two thermal conductive plates 221 are mirror symmetrically mated together along the thickness direction T of the fixture 22. Therefore the thermal conductive plate 221 is not only easy to manufacture but also easy to assemble.

Figure 4:
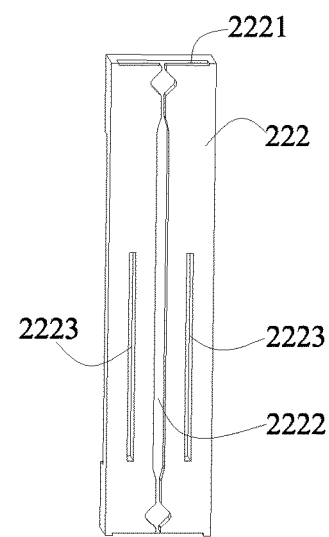
FIG. 4 is a perspective view of a support block of FIG. 1.
Figure 5:
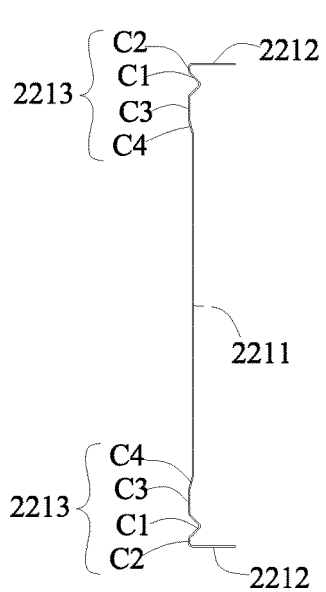
FIG. 5 is a plan view of a thermal conductive plate of FIG. 1 viewed from a length direction.
Figure 6:
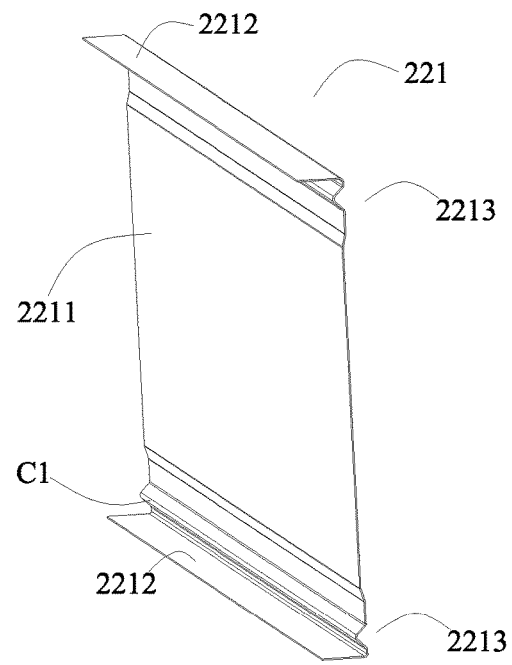
FIG. 6 is a perspective view of FIG. 5.
Figure 7:
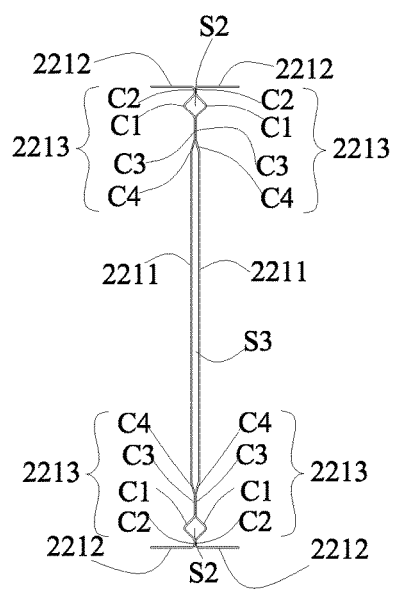
FIG. 7 is a plan view of two thermal conductive plates of FIG. 1 mating together viewed from the length direction.

As shown in FIG. 1 and FIG. 4, each support block 222 is provided with a receiving groove 2222, an end of each thermal conductive plate 221 in the length direction L is fixed in the receiving groove 2222 of the support block 222.

Each support block 222 is plastic. Each thermal conductive plate 221 is aluminum plate. Each thermal conductive plate 221 is formed by stamping.

The two support blocks 222 are integrally formed with the at least one thermal conductive plate 221. Of course, the formation method is not limited to this, and other formation method may be used, for example, each support block 222 and each thermal conductive plate 221 are formed separately and then the two support blocks 222 and the at least one thermal conductive plate 221 are fixed together by assembling.

A side of the receiving groove 2222 of each support block 222 is further provided with a through hole 2223 passing through each support block 222.

Each support block 222 is further provided with at least one positioning groove 2224 positioned on an outer side surface of the support block 222 in the length direction L.

In the fixture 22 according to the first aspect of the present disclosure, it should be noted that, when the fixture 22 is applied to the battery unit 2 described below and before the battery unit 2 is assembled, that is, the battery unit 2 described below is not mounted into the thermal conductive frame 1, the contact portion 2212 and the connecting portion 2213 of the thermal conductive plate 221 are perpendicular to each other (as shown in FIG. 1 to FIG. 9), of course, it is not limited to this, in another embodiment, the contact portion 2212 of each thermal conductive plate 221 inclines (such as 3-10 degrees) toward an outer side in the height direction H with respect to an outer surface of each support block 222 in the height direction H, so that an edge of the contact portion 2212 in the thickness direction protrudes in the height direction H relative to the outer surface of each support block 222 in the height direction H. When each battery unit 2 is mounted into the thermal conductive frame 1 described below, the contact portion 2212 of each thermal conductive plate 221 is squeezed by the thermal conductive frame 1, the contact portion 2212 elastically deforms and abuts toward each support block 222. Therefore, it effectively ensures the effective contact and the heat conduction area between the contact portion 2212 and an inner surface of the thermal conductive frame 1.

Secondly, a battery unit according to a second aspect of the present disclosure will be described.

Figure 14:
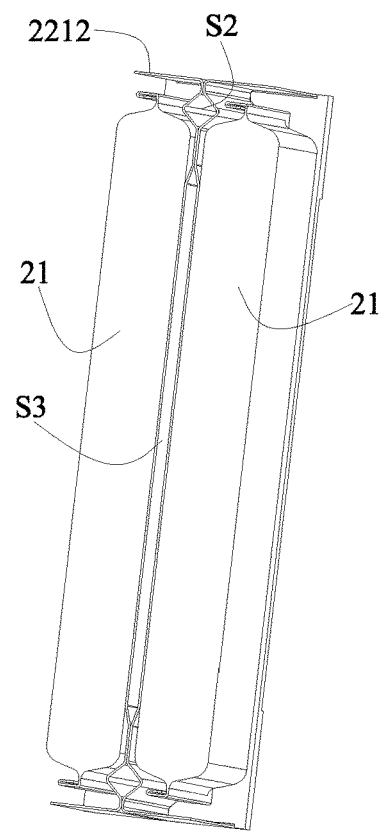
FIG. 14 is a perspective view taken along a B-B line in FIG. 12.

As shown in FIG. 1 to FIG. 14, a battery unit 2 according to a second aspect of the present disclosure comprises at least one pouch-shaped secondary battery 21, each pouch-shaped secondary battery 21 comprises a main body 211, the battery unit 2 further comprises the fixture 22 according to the first aspect of the present disclosure; each pouch-shaped secondary battery 21 is fixed in one receiving space S1 of the fixture 22; the abutting portion 2211 of each thermal conductive plate 221 is attached to the main body 211 of each pouch-shaped secondary battery 21 along the thickness direction T (referring to FIG. 14).

In the battery unit 2 according to the second aspect of the present disclosure, attaching the abutting portion 2211 of each thermal conductive plate 221 to the main body 211 of the pouch-shaped secondary battery 21 along the thickness direction T, heat generated by the pouch-shaped secondary battery 21 can be transferred to the abutting portion 2211 of the thermal conductive plate 221 which is attached to the main body 211 of the pouch-shaped secondary battery 21 and the heat can be transferred outwardly via the contact portion 2212, each fixture 22 uses the two support blocks 222 and the at least one pouch-shaped secondary battery 21 to form a battery unit 2, which makes the assembling of the plurality of battery units 2 easily, reduces the number of assembled components, improves the assembling efficiency of the battery module M, and reduces the costs.

Figure 11:
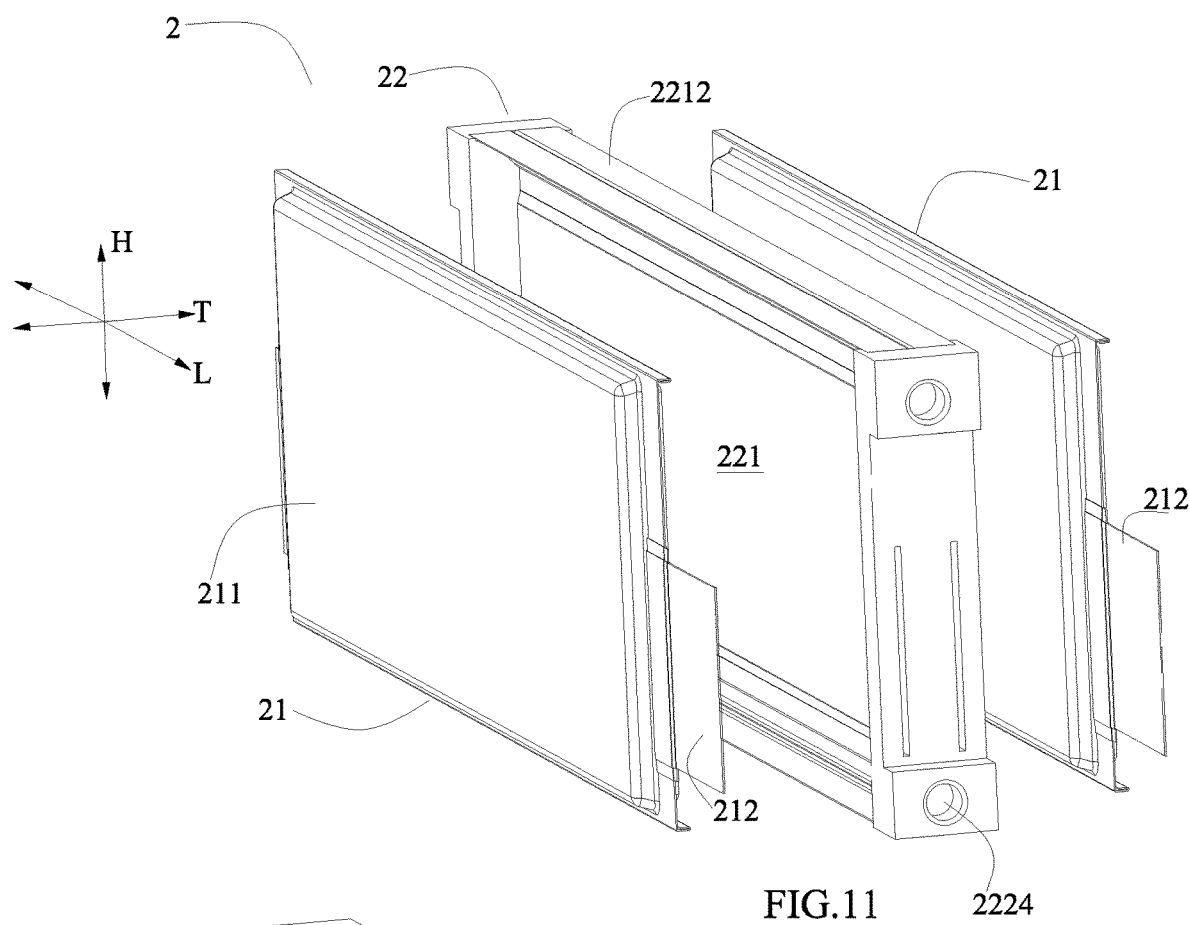
FIG. 11 is an exploded perspective view of a battery unit according to the present disclosure, in which electrode tabs are not bent.
Figure 12:
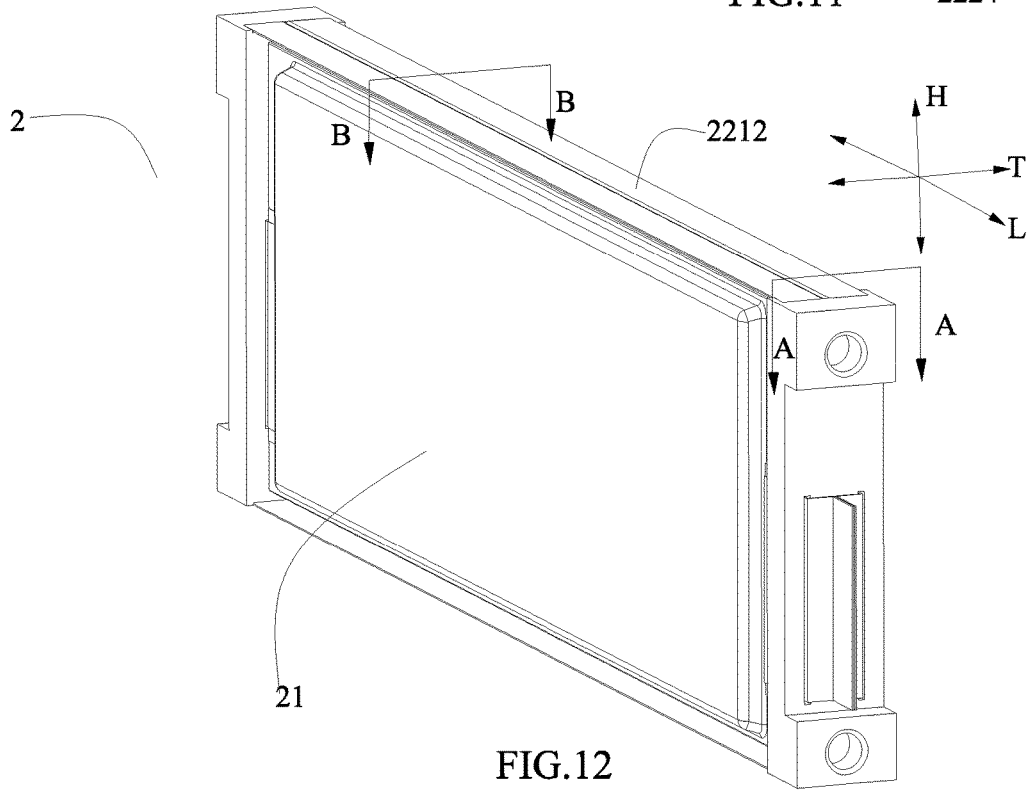
FIG. 12 is an assembled view of FIG. 11 in which the electrode tabs have been bent, and the electrode tabs may be bent when the battery unit is formed or may not be bent when the battery unit is formed but may be bent when the battery module is formed.
Figure 13:
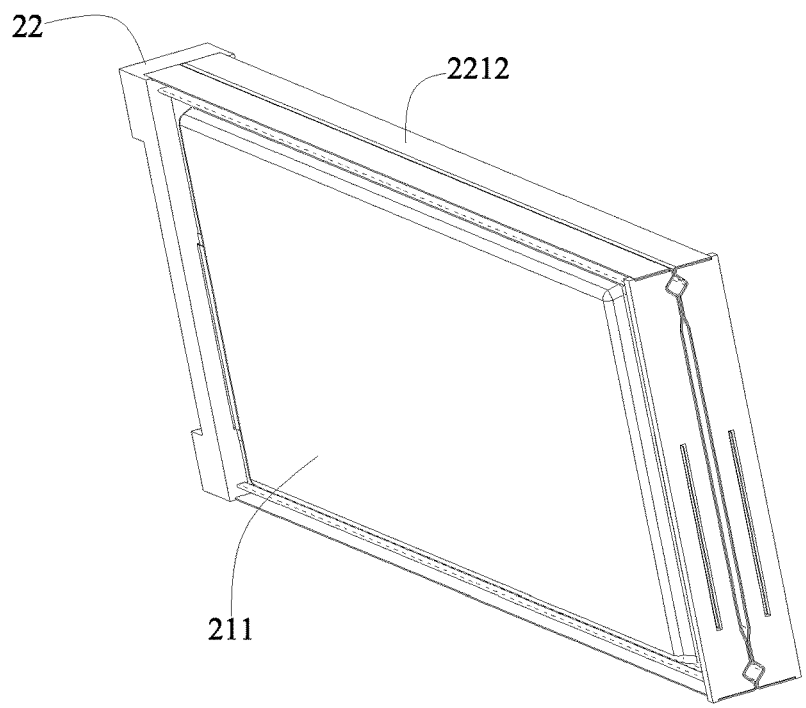
FIG. 13 is a perspective view taken along an A-A line in FIG. 12.

As shown in FIG. 11 and FIG. 12, each pouch-shaped secondary battery 21 comprises two electrode tabs 212 extending outwardly from two ends of the main body 211 in the length direction L respectively; the side of the receiving groove 2222 of each support block 222 is further provided with a through hole 2223 passing through each support block 222; each electrode tab 212 respectively passes through the corresponding through hole 2223 of the support block 222. In an alternative embodiment, the pouch-shaped secondary battery 21 comprises two electrode tabs 212 extending outwardly from one end of the main body 211 in the length direction L.

The main body 211 of each pouch-shaped secondary battery 21 is adhered and fixed to the abutting portion 2211 of the corresponding thermal conductive plate 221 of the fixture 22. In the battery unit 2 according to the second aspect of the present disclosure, referring to FIG. 12, preferably, when two pouch-shaped secondary batteries 21 are fixed in the fixture 22, the electrode tabs 212 of the two pouch-shaped secondary batteries 21 at one end of the length direction L bend oppositely and are attached together.

Next, a battery module according to a third aspect of the present disclosure will be described.

Figure 15:
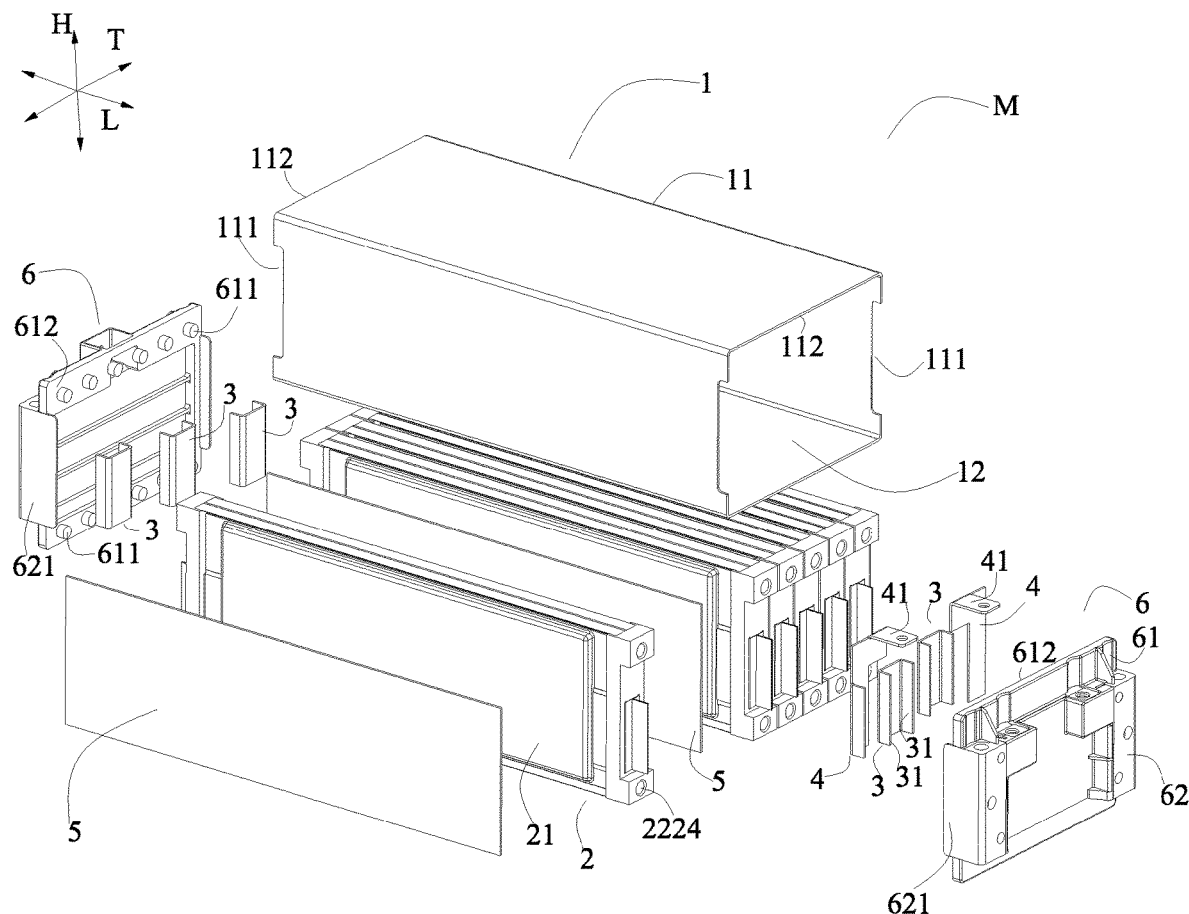
FIG. 15 is an exploded perspective view of a battery module according to the present disclosure.
Figure 16:
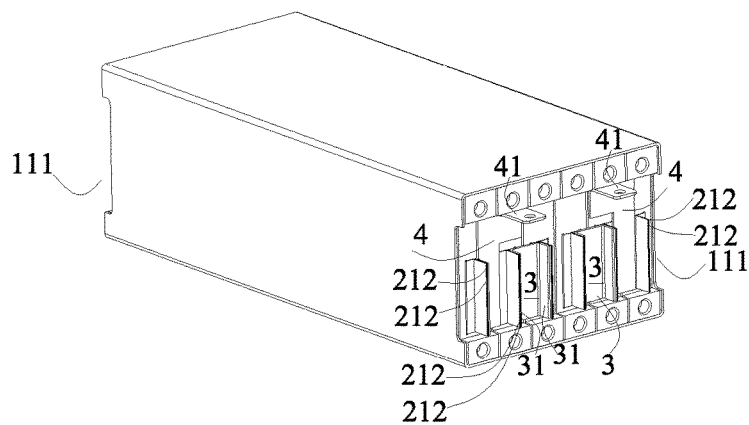
FIG. 16 is an assembled view of a part of components of FIG. 15.
Figure 17:
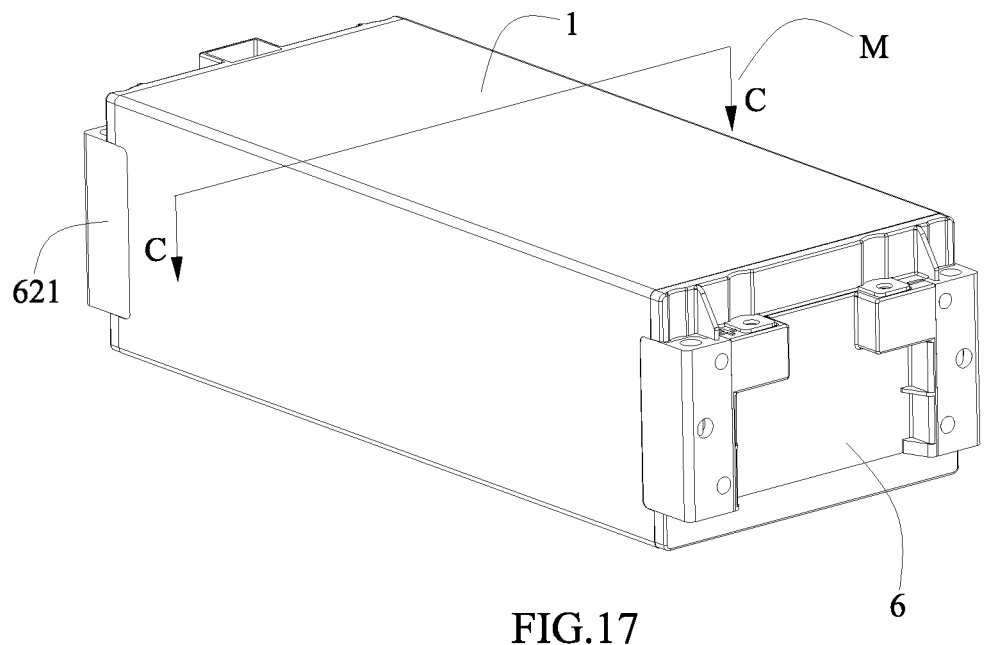
FIG. 17 is an assembled view of FIG. 15.
Figure 18:
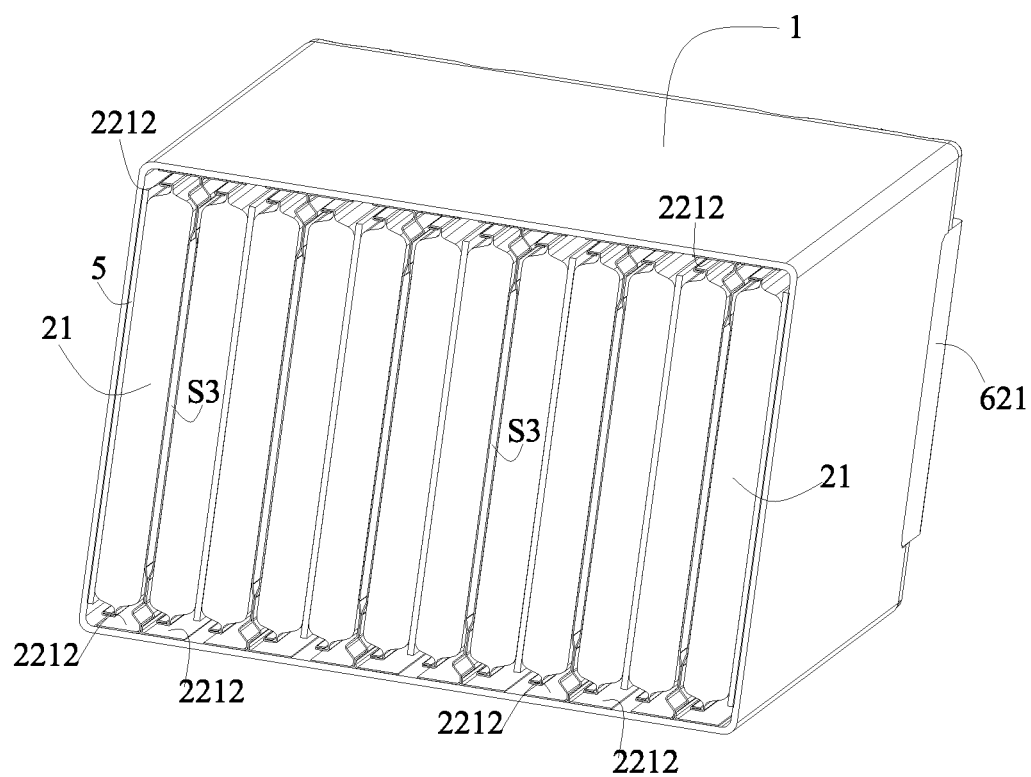
FIG. 18 is a perspective view taken along a C-C line in FIG. 17.

As shown in FIG. 15 to FIG. 17, a battery module M according to a third aspect of the present disclosure comprises a thermal conductive frame 1. The thermal conductive frame 1 has a peripheral wall 11 and a receiving cavity 112 enclosed by the peripheral wall 11, the receiving cavity 112 is closed in a circumferential direction and is opened at two ends in a length direction L; the battery module M further comprises a plurality of battery units 2 according to the second aspect of the present disclosure, the plurality of battery units 2 are arranged side by side and received in the receiving cavity 12, and the contact portion 2212 of each thermal conductive plate 221 contact the peripheral wall 11 of the thermal conductive frame 1.

In the battery module M according to the third aspect of the present disclosure, the contact portion 2212 of each thermal conductive plate 221 contacts the peripheral wall 11 of the thermal conductive frame 1, the thermal conductive frame 1 enclosed by the peripheral wall 11 and closed in circumference direction can use the whole peripheral wall 11 to dissipate heat, thereby improving the heat dissipation effect of the battery module M; the thermal conductive frame 1 enclosed by the peripheral wall 11 and closed in the circumference direction also can restrain the expansion generated by the pouch-shaped secondary batteries 21 during the charge-discharge cycle, so as to ensure the stability of the outer shape of the battery module M; each fixture 22 uses the two support blocks 222 and the at least one pouch-shaped secondary battery 21 to form a battery unit 2, which makes the assembling of the plurality of battery units 2 easily, reduces the number of assembled components, improves the assembling efficiency of the battery module M, and reduces the costs. When an external cooling system is used, the external cooling system is provided below the bottom of the peripheral wall 11, while the other part of the peripheral wall 11 will still conduct heat toward the external cooling system, thereby increasing the thermal connection with the external cooling system and improving the heat dissipation effect. In addition, the other part of the peripheral wall 11 can also be cooled by air so as to enhance the flexibility of the heat dissipation way.

As shown in FIG. 15 and FIG. 16, when the two pouch-shaped secondary batteries 21 are fixed in the fixture 22, the electrode tabs 212 of the two pouch-shaped secondary batteries 21 at one end in the length direction L are bent oppositely and are attached to each other; the battery module M further comprises: a plurality of connecting pieces 3 for connecting the plurality of pouch-shaped secondary batteries 21 together, each connecting piece 3 has two upright portions 31, each upright portions 31 electrically connects with the electrode tabs 212, which are bent oppositely and attached to each other, of the pouch-shaped secondary batteries 21 of each of two adjacent battery units 2; two output pieces 4 for outputs of the plurality of pouch-shaped secondary batteries 21, and each output piece 4 electrically connects with the electrode tabs 212, which are bent oppositely and attached to each other, of the pouch-shaped secondary batteries 21 of each of two battery units 2 respectively adjacent to the two output pieces 4.

In the battery module M according to the third aspect of the present disclosure, it should be noted that, before assembling, that is, the battery unit 2 is not mounted into the thermal conductive frame 1, the contact portion 2212 and the connecting portion 2213 of the thermal conductive plate 221 are perpendicular to each other (as shown in FIG. 11 to FIG. 14), of course, it is not limited to this, in another embodiment, when each battery unit 2 is not mounted into the thermal conductive frame 1, the contact portion 2212 of each thermal conductive plate 221 inclines (such as 3-10 degrees) toward an outer side in the height direction H with respect to an outer surface of the support block 222 in the height direction H, so that an edge of the contact portion 2212 in the thickness direction T protrudes in the height direction H relative to the outer surface of each support blocks 222 in the height direction H. When each battery unit 2 is mounted into the thermal conductive frame 1, the contact portion 2212 of each thermal conductive plate 221 is squeezed by the thermal conductive frame 1, the contact portion 2212 elastically deforms and abuts toward each support block 222. Therefore, it effectively ensures the effective contact between the contact portion 2212 and an inner surface of the thermal conductive frame 1 and further ensures the heat conduction area. Preferably, the attachment eventually makes the contact portion 2212 become a flattened state as shown in FIG. 11 to FIG. 14.

In the battery module M according to the third aspect of the present disclosure, as shown in FIG. 15, the battery module M further comprises a plurality of elastic buffering pads 5 respectively provided between every two adjacent battery units 2 and between two battery units 2 positioned at outermost sides of an arrangement direction and the thermal conductive frame 1. The elastic buffering pads 5 allow the plurality of battery units 2 to be easily assembled into the thermal conductive frame 1 after compression deformation, while after the plurality of battery units 2 are assembled into the thermal conductive frame 1, the elastic buffering pads 5 elastically recover, so that the elastic buffering pads 5 together with the thermal conductive frame 1 can firmly position and clamp the plurality of battery units 2, which ensures the structural stability of the battery units 2 and functions as buffering and can effectively ensure the stability of the heat dissipation path when the battery module M is subjected to external impact and/or vibration; in addition, the elastic deformation characteristics of the elastic buffering pads 5 can provide an expansion space for the expansion of the pouch-shaped secondary batteries during the charge-discharge cycle. The elastic buffering pad 5 may be a foam.

As shown in FIG. 15 and FIG. 16, the battery module M further comprises two end plates 6 respectively fixed to two ends of the opening of the thermal conductive frame 1 in the length direction L. Each output piece 4 comprises a protrusion 41 protruding outwardly along the length direction L; the protrusions 41 of the two output pieces 4 pass through and are sealed to one of the two end plates 6.

Referring to FIG. 15 to FIG. 17, each end plate 6 comprises: a plate body 61, an inner surface 612 of a periphery of the plate body 61 in the length direction L abuts an end surface 112 of the peripheral wall 11 of the thermal conductive frame 1 at one end in the length direction L; and an insert 62 securely provided on the plate body 61.

Each support block 222 is further provided with at least one positioning groove 2224 positioned at an outer side surface of each support block 222 in the length direction L; the plate body 61 is provided with at least one positioning protrusion 611 positioned at a side of the plate body 61 facing each support block 222; each positioning protrusion 611 is inserted into one positioning groove 2224. The design of the positioning groove 2224 and the positioning protrusion 611 allows the end plates 6 and the support blocks 222 of the plurality of battery units 2 to be positioned together, such a positioning manner will not form stress concentration point at the welding location between the battery module M and the end plates 6 described below in the process of mechanical vibration (that is, the external force is transferred to the plate body 61 via the positioning protrusion 611 and then transferred to the thermal conductive frame 1, so that the external force is dispersed). Of course, the positioning method is not limited to this, and other forms can be used to position.

As shown in FIG. 15 to FIG. 18, two ends of the peripheral wall 11 of the thermal conductive frame 1 in the length direction L are provided with recessed portions 111; each insert 62 comprises protruding portions 621 protruding along the length direction L respectively at a left side and a right side, each protruding portion 621 engages with each recessed portion 111. The edge of each protruding portion 621 and each recessed portion 111 of the peripheral wall 11 of the thermal conductive frame 1 may be welded together.

A material of the plate body 61 is plastic, and a material of the insert 62 is aluminum. The plate body 61 is integrated with the insert 62 by injection molding.

A material of the thermal conductive frame 1 is aluminum.

Finally, as an example, an assembling method of the battery module M according the third aspect of the present disclosure will be described.

An assembling method of the battery module M according the third aspect of the present disclosure comprises steps of: providing a plurality of elastic buffering pads 5 between every two adjacent battery units 2 and the outer surfaces of two battery units 2 positioned at the outermost sides of the arrangement direction to form a group; clamping the group with a fixture tool and mounted the group into the receiving cavity 12 of the thermal conductive frame 11; welding the output pieces 4 and the connecting pieces 3 to the electrode tabs 212 of the pouch-shaped secondary batteries 21; assembling the two end plates 6 and fixing the two end plates 6 to the ends of the thermal conductive frame 1 in the axial direction.

What is claimed is:

1. A fixture, comprising:
   two thermal conductive plates, each thermal conductive plate comprising:
      an abutting portion extending along a height direction;
      a contact portion positioned at a side of the abutting portion in the height direction and extending toward a thickness direction of the thermal conductive plate; and
      a connecting portion connecting the abutting portion and the contact portion along the height direction; and
   two support blocks respectively fixed on two ends of the two thermal conductive plates in a length direction;
   the abutting portion, the connecting portion and the contact portion of each thermal conductive plate and the two support blocks forming a receiving space having an opening opened away from the abutting portion,
   wherein the connecting portion of each thermal conductive plate is formed with a bending section formed as a V-shape and extending along the length direction of each thermal conductive plate, a bending corner of the bending section protrudes toward the opening of the receiving space;
   the two thermal conductive plates abut together along the thickness direction of the fixture;
   the bending sections of the two thermal conductive plates are opposed to each other and enclose a hollow cavity;
   the connecting portion of each thermal conductive plate is further formed with a connection section connecting one end of the bending section in the height direction with the contact portion;
   the connecting portion of each thermal conductive plate is further formed with:
      an abutting section extending along the height direction, one end of the abutting section in the height direction connects with the other end of the bending section in the height direction; and
      an inclined section connecting the abutting section and the abutting portion, inclining from the abutting section toward the abutting portion so that the abutting portion is close to the opening of the receiving space relative to the abutting section.

2. The fixture according to claim 1, wherein the two connection sections of the two thermal conductive plates abut together along the thickness direction of the fixture.

3. The fixture according to claim 1, wherein
   the two abutting sections of the two thermal conductive plates abut together along the thickness direction of the fixture;
   the inclined section and the abutting portion of one thermal conductive plate and the inclined section and the abutting portion of the other thermal conductive plate are spaced apart from each other to form a middle space.

4. A battery unit, comprising two pouch-shaped secondary batteries, each pouch-shaped secondary battery comprising a main body, wherein the battery unit further comprises a fixture, the fixture comprising:
   two thermal conductive plates, each thermal conductive plate comprising:
      an abutting portion extending along a height direction;
      a contact portion positioned at a side of the abutting portion in the height direction and extending toward a thickness direction of the thermal conductive plate; and
      a connecting portion connecting the abutting portion and the contact portion along the height direction; and
   two support blocks respectively fixed on two ends of the two thermal conductive plates in a length direction;
   the abutting portion, the connecting portion and the contact portion of each thermal conductive plate and the two support blocks form a receiving space having an opening opened away from the abutting portion;
   each pouch-shaped secondary battery is fixed in one receiving space of the fixture, the abutting portion of each thermal conductive plate is attached to the main body of each pouch-shaped secondary battery along the thickness direction,
   wherein the connecting portion of each thermal conductive plate is formed with a bending section formed as a V-shape and extending along the length direction of each thermal conductive plate, a bending corner of the bending section protrudes toward the opening of the receiving space;
   the two thermal conductive plates abut together along the thickness direction of the fixture;
   the bending sections of the two thermal conductive plates are opposed to each other and enclose a hollow cavity;
   the connecting portion of each thermal conductive plate is further formed with a connection section connecting one end of the bending section in the height direction with the contact portion;
   the connecting portion of each thermal conductive plate is further formed with:
      an abutting section extending along the height direction, one end of the abutting section in the height direction connects with the other end of the bending section in the height direction; and
      an inclined section connecting the abutting section and the abutting portion, inclining from the abutting section toward the abutting portion so that the abutting portion is close to the opening of the receiving space relative to the abutting section.

5. The battery unit according to claim 4, wherein the two connection sections of the two thermal conductive plates abut together along the thickness direction of the fixture.

6. The battery unit according to claim 4, wherein
   the two abutting sections of the two thermal conductive plates abut together along the thickness direction of the fixture;
   the inclined section and the abutting portion of one thermal conductive plate and the inclined section and the abutting portion of the other thermal conductive plate are spaced apart from each other to form a middle space.

7. A battery module, comprising:
   a thermal conductive frame, having:
      a peripheral wall; and
      a receiving cavity enclosed by the peripheral wall, the receiving cavity being closed in a circumferential direction and being opened at two ends in a length direction;
   wherein the battery module further comprises a plurality of battery units,
   each battery unit comprises:
      two pouch-shaped secondary batteries, each pouch-shaped secondary battery comprises a main body,
      wherein each battery unit further comprises:
      a fixture, the fixture comprises:
         two thermal conductive plates, each thermal conductive plate comprising:
            an abutting portion extending along a height direction; and a contact portion positioned at a side of the abutting portion in the height direction and extending toward a thickness direction of the thermal conductive plate; and a connecting portion connecting the abutting portion and the contact portion along the height direction; and two support blocks respectively fixed on two ends of the two thermal conductive plates in a length direction;

the abutting portion, the connecting portion and the contact portion of each thermal conductive plate and the two support blocks form a receiving space having an opening opened away from the abutting portion;

each pouch-shaped secondary battery is fixed in one receiving space of the fixture, the abutting portion of each thermal conductive plate is attached to the main body of each pouch-shaped secondary battery along the thickness direction;

the plurality of battery units are arranged side by side and are received in the receiving cavity, and the contact portion of each thermal conductive plate contacts the peripheral wall of the thermal conductive frame, wherein the connecting portion of each thermal conductive plate is formed with a bending section formed as a V-shape and extending along the length direction of each thermal conductive plate, a bending corner of the bending section protrudes toward the opening of the receiving space;

the two thermal conductive plates abut together along the thickness direction of the fixture;

the bending sections of the two thermal conductive plates are opposed to each other and enclose a hollow cavity.

8. The battery module according to claim 7, wherein the connecting portion of each thermal conductive plate is further formed with a connection section connecting one end of the bending section in the height direction with the contact portion.

9. The battery module according to claim 8, wherein
the two connection sections of the two thermal conductive plates abut together along the thickness direction of the fixture.

10. The battery module according to claim 8, wherein
the connecting portion of each thermal conductive plate is further formed with: an abutting section extending along the height direction, one end of the abutting section in the height direction connects with the other end of the bending section in the height direction; and an inclined section connecting the abutting section and the abutting portion, inclining from the abutting section toward the abutting portion so that the abutting portion is close to the opening of the receiving space relative to the abutting section;

the two abutting sections of the two thermal conductive plates abut together along the thickness direction of the fixture;

the inclined section and the abutting portion of one thermal conductive plate and the inclined section and the abutting portion of the other thermal conductive plate are spaced apart from each other to form a middle space.

* * * * *